(12) United States Patent
Campbell et al.

(10) Patent No.: US 11,792,361 B2
(45) Date of Patent: Oct. 17, 2023

(54) REDRIVER CAPABLE OF SWITCHING BETWEEN LINEAR AND LIMITED MODES

(71) Applicant: Texas Instruments Incorporated, Dallas, TX (US)

(72) Inventors: Charles Michael Campbell, Lucas, TX (US); Mustafa Ulvi Erdogan, Allen, TX (US); Douglas Edward Wente, Murphy, TX (US); Sridhar Ramaswamy, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 114 days.

(21) Appl. No.: 17/363,158

(22) Filed: Jun. 30, 2021

(65) Prior Publication Data

US 2022/0150445 A1    May 12, 2022

Related U.S. Application Data

(60) Provisional application No. 63/112,763, filed on Nov. 12, 2020.

(51) Int. Cl.
*H04N 7/10* (2006.01)
*H04N 21/442* (2011.01)
*H04N 21/4363* (2011.01)

(52) U.S. Cl.
CPC ....... *H04N 7/102* (2013.01); *H04N 21/43635* (2013.01); *H04N 21/44227* (2013.01)

(58) Field of Classification Search
None
See application file for complete search history.

(56) References Cited

U.S. PATENT DOCUMENTS

| 2015/0261718 | A1 | 9/2015 | Campbell et al. |
| 2016/0041940 | A1* | 2/2016 | Spehar ............... G06F 13/4068 710/106 |
| 2017/0371831 | A1 | 12/2017 | Das Sharma |
| 2018/0293198 | A1 | 10/2018 | Vertenten |
| 2019/0288743 | A1 | 9/2019 | Wang et al. |
| 2020/0304088 | A1 | 9/2020 | Khan. P |

OTHER PUBLICATIONS

International Search Report in corresponding PCT Application No. PCT/US2021/059045, dated Feb. 10, 2022 (2 pages).

* cited by examiner

*Primary Examiner* — Samira Monshi
(74) *Attorney, Agent, or Firm* — Valerie M. Davis; Frank D. Cimino

(57) ABSTRACT

A redriver system adapted for coupling to a first device and to a second device includes first and second transmitter drivers and a snoop circuit. The first transmitter driver has a first enable input. The second transmitter driver has a second enable input. The snoop circuit is coupled to the first and second enable inputs. The snoop circuit is configured to determine whether the first device and the second device are to operate according to a first protocol. Responsive to the snoop circuit determining that the first and second devices are to operate according to the first protocol, the snoop circuit enables the first transmitter driver and disables the second transmitter driver. Responsive to the snoop circuit determining that the first and second devices are not to operate according to the first protocol, the snoop circuit disables the first transmitter driver and enables the second transmitter driver.

20 Claims, 4 Drawing Sheets

REDRIVER CAPABLE OF SWITCHING BETWEEN LINEAR AND LIMITED MODES

CROSS-REFERENCE TO RELATED APPLICATION

This application claims priority to U.S. Provisional Application No. 63/112,763, filed Nov. 12, 2020, which is hereby incorporated by reference.

BACKGROUND

In the context of a first device sending data (e.g., video and/or audio) to a second device, each device may comply with a given interface protocol. For example, the first device may be a video source (e.g., cable box, Internet-connected streaming device, computer, etc.) and the second device may be a display monitor, and each device may implement the High-Definition Multimedia Interface (HDMI). A source device implementing HDMI transfers both high definition audio and video over a single cable to an HDMI-compliant sink device. The source device also may include a redriver which is a circuit that implements equalization to reduce inter-symbol interference (ISO.

SUMMARY

In one example, a redriver system is adapted for coupling to a first device and to a second device includes first and second transmitter drivers and a snoop circuit. The first transmitter driver has a first enable input. The second transmitter driver has a second enable input. The snoop circuit is coupled to the first and second enable inputs. The snoop circuit is configured to determine whether the first device and the second device are to operate according to a first protocol. Responsive to the snoop circuit determining that the first and second devices are to operate according to the first protocol, the snoop circuit enables the first transmitter driver and disables the second transmitter driver. Responsive to the snoop circuit determining that the first and second devices are not to operate according to the first protocol, the snoop circuit disables the first transmitter driver and enables the second transmitter driver.

In another example, a method includes determining whether a first device and a second device are to operate according to a first protocol. Responsive to determining that the first and second devices are to operate according to the first protocol, the method includes enabling a first transmitter driver and disabling a second transmitter. Responsive to the snoop circuit determining that the first and second devices are to operate according to a protocol other than the first protocol, the method includes disabling the first transmitter driver and enabling the second transmitter.

BRIEF DESCRIPTION OF THE DRAWINGS

For a detailed description of various examples, reference will now be made to the accompanying drawings in which.

The same reference numbers or other reference designators are used in the drawings to designate the same or similar (functionally and/or structurally) features.

DETAILED DESCRIPTION

Figure 1:
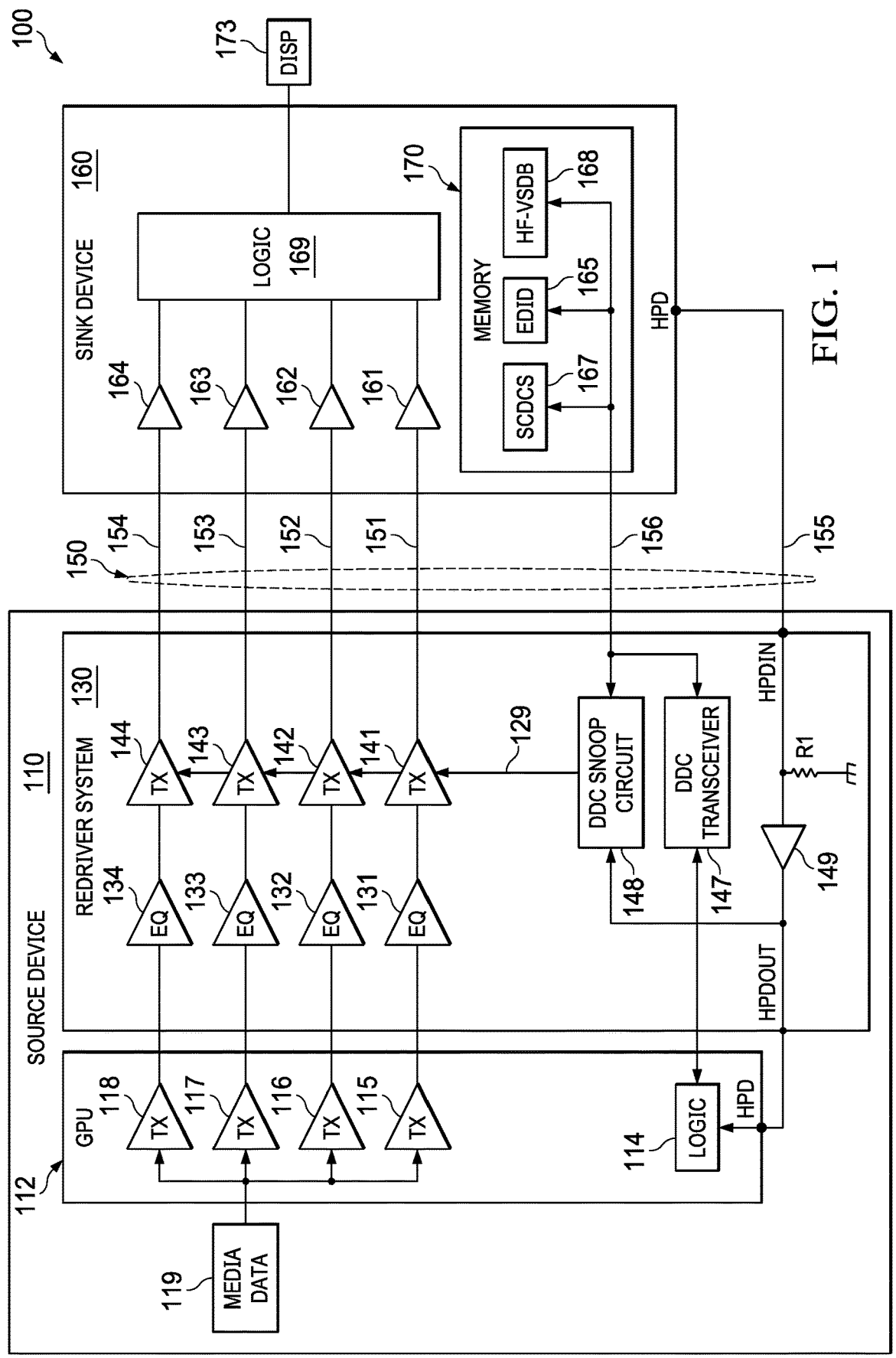
FIG. 1 is a block diagram showing a source device including a redriver system capable of either linear or limited modes of operation coupled to a sink device, in accordance with an example.

An HDMI driver can be either a "linear" redriver or a "non-linear" redriver. A non-linear redriver is also referred to as a limited redriver. A linear redriver implements a near-linear relationship between the input signal (e.g., voltage) to the redriver and its output signal, at least over the range of interest. A limited redriver, however, implements pre-emphasis and amplitude control resulting in its output signal not being a linear function of its input signal.

Multiple versions of the HDMI protocol have been established including, for example, HDMI 1.4, HDMI 2.0, and HDMI 2.1. Each of these HDMI Specifications are hereby incorporated by reference in their entirety. The HDMI 1.4 protocol provides for a maximum data rate of 10.2 Gigabits per second (Gbps). HDMI 2.0 provides for a maximum data rate of 18 Gbps. Both HDMI 1.4 and 2.0 specify a transition-minimized differential signaling (TMDS) encoding technique in which a dock signal is transmitted in a conductor in the HDMI cable along with the video and audio signals. The HDMI 2.1 protocol provides for even higher data transfer rates (e.g., up to 48 Gbps). HDMI 2.1 does not include the transmission of a clock signal between source and sink devices and repurposes the clock pins used in HDMI 1.4 and 2.0 as an additional data channel.

When two HDMI-compliant devices are connected and powered on, the source device obtains device-related data from the sink device. The device-related data includes, for example, Extended Data Identification Data (EDID), HDMI Forum Vendor Specific data Block (HF-VSDB), and Status and Control Data Structure (SCDCS), which are stored in non-volatile memory in the sink device. The sink device's EDID, for example, specifies parameters such as the size of the sink device's display, chromaticity values, timing values, etc. The HF-VSDB contains the maximum data rate capability of the sink device, and other device-specific data pertaining to the sink device. The source device uses the sink's device-specific data to determine the sink device's capabilities and then selects a display resolution, data rate, etc. that aligns to the capabilities of both the source and sink devices. The source device then writes values to the sink's SCDCS to specify to the sink device the common capabilities that the source device has determined to control the interaction between the source and sink devices (e.g., resolution, data rate, etc.).

HDMI 2.1 also provides for "link training" between the source and sink devices. Link training is not implemented in earlier versions of HDMI (e.g., HDMI 1.4 and 2.0). The purpose of link training is for the source device to configure itself for suitable levels of pre-emphasis, voltage swing, etc. with the goal to reduce or eliminate errors. The link training procedure is initiated and controlled by the source device. During the link training procedure, the sink device recovers the source device's clock which is embedded in a data channel. The source device also sends test patterns to the sink device. The test patterns enable the source device to adjust its transmitter's swing, pre-shoot, and de-emphasis levels to values that enable a more robust signal for the sink device and accordingly to reduce or eliminate errors observed by the sink device. Unfortunately, the link training procedure does not work reliably for a source device that uses a limited redriver. Using a limited redriver during link training in which the sink device and the source device's graphics processor unit (GPU) are not aware of the presence of the limited redriver will increase the risk of link training failure. A linear redriver is transparent to link training and therefore has little or no impact on link training. Accordingly, the link training procedure will be more reliable if a linear redriver, instead of a limited redriver, is used in the source device.

The HDMI protocol is backward compatible meaning that any pair of HDMI-compliant source and sink devices will operate together regardless of which version of HDMI each implements. For example, an HDMI 2.1 source device can be connected to an HDMI 1.4 sink device, an HDMI 2.0 sink device, or an HDMI 2.1 sink device. This means that an HDMI 2.1 source device will be capable of performing link training if that source device were connected to an HDMI 2.1 sink device. However, if the HDMI 2.1 source device is connected to an HDMI 1.4 or 2.0 sink device (or another version of HDMI promulgated before HDMI 2.1), the HDMI 2.1 source device will not engage in the link training protocol because the pre-HDMI 2.1 sink device will not have that capability.

The embodiments described herein are directed to a redriver system that has both linear and limited redriver modes of operation. The redriver system includes a snoop circuit that monitors the channel between the source and sink devices in which the sink device's capabilities are read by the source device, and the source device writes values back to the sink device as part of the process of the source and sink devices negotiating a set of parameters regarding display resolution, pre-emphasis, voltage swing, etc. In one embodiment, the redriver system's snoop circuit snoops one or more of the values that the source device's GPU writes to the sink device regarding their mutual capabilities upon which the source device has specified for their operation. Based on the snooped information, the snoop circuit determines whether the source and sink devices are to configure themselves for operation according to the HDMI 2.1 protocol or a non-HDMI 2.1 protocol (e.g., a pre-HDMI 2.1 protocol such as HDMI 1.4 or HDMI 2.0). If the snoop circuit determines that the source and sink devices are to operate according to the HDMI 2.1 protocol, then the snoop circuit causes the redriver system to be configured for the linear redriver mode. If the snoop circuit determines that the source and sink devices are not to operate according to the HDMI 2.1 protocol, then the snoop circuit causes the redriver system to be configured for the limited redriver mode.

FIG. 1 is a block diagram of a system 100 that includes a source device 110 coupled to a sink device 160 by way of a cable 150. In one example, the source device 110 includes or otherwise obtains audio and/or video data (referred to herein as "media" data), and provides the media data over the cable 150 to the sink device. The source device 110 may be a computer, a set-top box, a cable box, a WiFi streaming device, etc. The sink device 160 may be a display monitor or any other type of device that utilizes/displays media data. The sink device 160 includes memory 170 in which the sink device's EDID 165, SCDCS 167, and HF-VSDB 168 are stored. Memory 170 may be non-volatile memory. The SCDCS 167 may be stored in memory that can be both read and written. The EDID 165 and HF-VSDB 168 may be stored in memory that is read-only (e.g., read-only memory, "ROM").

In the example described herein, the source device 110 and the sink device 160 are HDMI-compliant. The source device 110 is an HDMI 2.1 device and thus is compatible with HDMI 2.1 sink devices and is backwards compatible with sink devices that comply with earlier versions of HDMI (e.g., HDMI 1.4 or HDMI 2.0). While the source device 110 is an HDMI 2.1 device, the sink device 160 can be an HDMI 2.1 device or may be compliant with an earlier version of HDMI such as HDMI 1.4 or 2.0. The HDMI version of a device means that that device can operate according to its designated version or according to any of the earlier versions of HDMI. For example, an HDMI 2.0 device can operate according to the HDMI 2.0 or 1.4 protocols, but not the HDMI 2.1 protocol. During the discovery process in which the source device 110 reads the sink device's EDID 165, SCDCS 167, and HF-VSDB 168, the source device 110 determines the parameters according to which both the source and sink devices are to operate (e.g., data rate, resolution, etc.). For example, with the source device 110 being HDMI 2.1 compatible, if the sink device is HDMI 2.0-compatible, the source device will determine that both devices should configure themselves for HDMI 2.0 operation. Despite the source device 110 being HDMI 2.1 compatible, the source device thus will configure itself for HDMI 2.0 operation.

The source device 110 in the example of FIG. 1 includes a graphics processor unit (GPU) 112 coupled to a redriver system 130. The cable 150 is an HDMI-compliant cable and includes four twisted wire pairs 151, 152, 153, and 154. Each pair of twisted wires is for a separate channel. In HDMI 1.4 and 2.0, three of the channels are used for video and/or audio data and the fourth channel is used for a clock. In HDMI 2.1, there is no separate clock signal transmitted across the cable 150 and thus all four channels can be used for data. A serial communication link (e.g., Inter-Integrated Circuit, "I2C") over wire 156 also is provided through the cable 150 between sink and source devices over which the GPU 112 can read the sink device's EDID 165, SCDCS 167, and HF-VSDB 168 and provide parameter values back to the sink device to be stored in the HF-VSDB 168. The wire 156 may be a single wire or a pair of wires such as a clock wire and a serial data wire. The communication link over wire 156 may be referred to as a display data channel (DDC). The cable 150 also includes a hot plug detect (HPD) wire 155 that enables the source device 110 to detect whether the cable 150 is connected to a powered-on sink device 160.

In the example of FIG. 1, all of the signals provided through the cable 150 between the sink device 160 and the GPU 112 (within the source device 110) flow through the redriver system 130. In other examples, one or more of the signals may bypass the redriver system 130 (e.g., the DDC information on wire 156 may not pass through the redriver system 130).

In the example of FIG. 1, the GPU 112 includes four transmitters 115, 116, 117, and 118, corresponding to each of the four data channels (or three data channels plus a clock) mentioned above. The sink device 160 has four corresponding receivers 161, 162, 163, and 164 coupled to logic 169. Logic 169 may include a processor, digital logic, application specific integrated circuit (ASIC), memory and/or any other type of circuitry that receives, processes, and consumes the media data from the source device 110. Logic 169 provides media data to a display 173. Display 173 may be coupled to the sink deice 160 or may be a component of the sink device. The display device 173 may include one or more speakers for playing audio.

The redriver system 130 includes four equalizer/transmitter pairs. Equalizer 131 is coupled to transmitter 141. The output of transmitter 115 is coupled to the input of equalizer 131, and the output of transmitter 141 is coupled to the input of receiver 161 in the sink device 160 via wire 151 in the cable 160. Equalizer 132 is coupled to transmitter 142. The output of transmitter 116 is coupled to the input of equalizer 132, and the output of transmitter 142 is coupled to the input of receiver 162 in the sink device 160 via wire 152 in the cable. Equalizer 133 is coupled to transmitter 143. The output of transmitter 117 is coupled to the input of equalizer 133, and the output of transmitter 143 is coupled to the input of receiver 163 in the sink device 160 via wire 153 in the cable. Equalizer 134 is coupled to transmitter 144. The output of transmitter 118 is coupled to the input of equalizer 134 and the output of transmitter 144 is coupled to the input of receiver 164 in the sink device 160 via wire 154 in the cable. In one example, each of wires 151, 152, 153, and 154 is a twisted wire pair.

In one example, the GPU's logic 114 includes a processor, memory, and/or other digital circuitry that is configured to execute software. In another example, logic 114 is a discrete digital circuit. Logic 114 causes media data to be transmitted via the transmitters 115-118, through the corresponding equalizer/transmitter pairs of the redriver system 130 to the receivers 161-164 within the sink device 160. The source device 110 may have storage containing media data 119 to be provided to the sink device 160 via one or more of transmitters 115-118. The media data 119 may be obtained by logic 114 from a disk (e.g., Blu-Ray disk, DVD disk, CD ROM, etc.) or the media data may be streamed from a network (e.g., from the Internet) through the GPU 112 to the sink device 160.

In one embodiment, the GPU 112 is implemented as an integrated circuit (IC) containing the GPU 112 and the redriver system 130 on the same semiconductor die. In another embodiment, the redriver system 130 is implemented as an IC that is separate from the IC on which the GPU 112 is implemented. That is, the GPU 112 may be on one IC and the redriver system 130 may be another IC, and both ICs may be included as part of the source device 110. For example, the ICs forming the GPU 112 and the redriver system 130 may be mounted on a printed circuit board (PCB) within the source device 110.

The HDMI protocol implements hot plug detect (HPD) capability in which a source device and a sink device can be connected via cable 150 while both devices are powered on. On the source device 110 side of cable 150, the source device 110 includes a pull-down resistor R1 coupling wire 155 to ground. In the embodiment of FIG. 1, the pull-down resistor R1 is included within the redriver system 130. In another embodiment, the pull-down resistor R1 is external to the redriver system 130. The HPD signal (the voltage on resistor R1) is logic low when no cable is connected or when the cable is connected but the sink device 160 is powered off. With the cable 150 connected and the sink device 160 powered on, the HPD signal is pulled high (above a threshold) because the HPD line within the sink device 160 is coupled to a suitably high voltage source (not shown). A buffer 149 is provided within the redriver 130 to drive the HPD signal to logic 114 within the GPU 112. By monitoring the logic level of the HPD signal, logic 114 can determine whether or not a powered-on sink device 160 is cabled to the source device 110.

As described above, the HDMI protocol provides a DDC interface between the source and sink devices. In one example, the DDC interface is a protocol implemented over a serial data link through wire 156 of cable 150 through which the EDID 165, SCDCS 167, and HF-VSDB 168 from the sink device 160 is provided to the GPU 112, and through which the GPU 112 writes one or more parameter values back to the sink's SCDCS 167. Logic 114 in the GPU 112 issues one or more read requests to the sink device 160 to read the EDID 165, SCDCS 167, and HF-VSDB 168 from the sink device's memory 170. The GPU's logic 114 issues the read requests responsive to, for example, the logic 114 detecting a logic low to logic high transition of the HPD input.

The redriver system 130 includes DDC transceiver 147 that receives and decodes DDC bi-directional traffic communicated between the source 112 and the sink device 160. For example, requests from the GPU's logic 114 to read the EDID 165, SCDCS 167, and HF-VSDB 168 are forwarded through DDC transceiver 147 to the sink device 160, and the read data (EDID, SCDCS, and HF-VSDB) from the sink device 160 are returned to logic 114 through the DDC transceiver 147. The logic 114 also writes one or more parameters back to the SCDCS 167 in the sink device 160 through the transceiver 147. The redriver system 130 also includes a DDC snoop circuit 148 which monitors the bi-directional traffic through the DDC transceiver 147 for a set of predetermined packets that indicate whether the source device 110 enables the source and sink devices 110 and 160 for the HDMI 2.1 protocol or fora non-HDMI 2.1 protocol (e.g., HDMI 1.4 or HDMI 2.0).

The GPU 112 (e.g., logic 114) reads the EDID 165, SCDCS 167, and the HF-VSDB 168 from the sink device's memory 170. The HF-VSDB 168 includes a value called MAX_TMDS_Character_Rate and a value called Max_FRL_Rate. Transition Minimized Differential Signaling (TMDS) is a technique for transmitting high speed digital data while reducing electromagnetic interference (EMI) and enabling dock recovery at relatively large distances up to, for example, 100 feet. TMDS is implemented as part of HDMI 1.4 and 2.0, but not 2.1. The MAX_TMDS_Character_Rate is the maximum TMDS character rate that the sink device 160 supports. In one example, if the sink device 160 does not support a TMDS character rate greater than 340 mega-characters per second (Mcsc), the MAX_TMDS_Character_Rate is set to 0; otherwise this field is non-zero and indicates the maximum TMDS character rate supported by the sink device. The MAX_TMDS_Character_Rate value is, for example an eight-bit value in byte number 5 of the HF_VDSB 168.

The fixed rate link (FRL) is a signaling protocol specified in HDMI 2.1, but not in earlier versions of HDMI (e.g., not in HDMI 1.4 or 2.0). The Max_FRL_Rate value is, for example, a four-bit value in byte number 7 of the HF_VDSB 168. The Max_FRL_Rate indicates the level of FRL for which the sink device is capable. A Max_FRL_Rate value of 0 means that fixed rate link is not supported by the sink device. Non-zero Max_FRL_Rates indicate the data rates of the various lanes. Table I below includes the possible values of Max_FRL_Rate in accordance with the HDMI specification.

TABLE I

MAX_FRL_RATE

| MAX_FRL_RATE | Description |
|---|---|
| 0 | Fixed Rate Link is not supported |
| 1 | Fixed Rate Link of 3 Gbps per lane on lanes 0, 1, and 2 is supported. Other FRL rates and lane configurations are not supported. |
| 2 | Fixed Rate Link of 3 and 6 Gbps per lane on lanes 0, 1, and 2 is supported. Other FRL rates and lane configurations are not supported. |
| 3 | Fixed Rate Link of 3 and 6 Gbps per lane on lanes 0, 1, and 2 is supported. Fixed Rate Link at 6 Gbps per lane on four lanes is supported. Other FRL rates and lane configurations are not supported. Other FRL rates and lane configurations are not supported. |
| 4 | Fixed Rate Link of 3 and 6 Gbps per lane on lanes 0, 1, and 2 is supported. Fixed Rate Link at 6 and 8 Gbps per lane on four lanes is supported. Other FRL rates and lane configurations are not supported. Other FRL rates and lane configurations are not supported. |
| 5 | Fixed Rate Link of 3 and 6 Gbps per lane on lanes 0, 1, and 2 is supported. Fixed Rate Link at 6, 8, and 10 Gbps per lane on four lanes is supported. Other FRL rates and lane configurations are not supported. Other FRL rates and lane configurations are not supported. |
| 6 | Fixed Rate Link of 3 and 6 Gbps per lane on lanes 0, 1, and 2 is supported. Fixed Rate Link at 6, 8, 10, and 12 Gbps per lane on four lanes is supported. |
| 7-15 | Reserved |

Among other values, the GPU 112 reads the Max_TMDS_Character_Rate and Max_FRL_Rate values from the sink device's HF-VSDB 168 to determine the capabilities of the sink device 160. Based on those values, the GPU 112 determines the capabilities that both the source and sink devices share in common. Based on this determination, the GPU 112 writes values into the sink device's SCDCS 167. For example, the GPU 112 determines and writes a bit called TMDS_Bit_Clock_Ratio and a four-bit value called FRL_Rate into the sink device's SCDCS 167. The TMDS_Bit_Clock_Ratio bit is, for example, bit number 1 of the TMDS configuration byte at offset 0x20 within the SCDCS 167. The TMDS_Bit_Clock_Ratio bit defaults to a value of 0 which indicates that the ratio between the TMDS bit period and the TMDS clock period is ⅒. However, the GPU 112 can set the TMDS_Bit_Clock_Ratio bit to a 1 to specify that the ratio between the TMDS bit period and the TMDS clock period is ¹⁄₄₀.

The FRL_Rate value is, for example, bits [3:0] of the sink configuration byte at offset 0x31 within the SCDCS 167. The FRL_Rate field defaults to a value of 0 which indicates that the sink device will not support FRL signaling. However, the GPU 112 can write a non-zero value to the sink's FRL_Rate field corresponding to the data rate that the source determines is compatible for both the source and sink devices. Table II below is an example of the possible values for the FRL_Rate that the GPU 112 writes into the sink device's SCDCS 167.

TABLE II

FRL_RATE

| FRL_RATE | Description |
|---|---|
| 0 | Disable FRL |
| 1 | FRL at 3 Gbps on lanes 0, 1, and 2 |
| 2 | FRL at 6 Gbps on lanes 0, 1, and 2 |
| 3 | FRL at 6 Gbps on all four lanes |
| 4 | FRL at 8 Gbps on all four lanes |
| 5 | FRL at 10 Gbps on all four lanes |
| 6 | FRL at 12 Gbps on all four lanes |
| 7:15 | Reserved |

Figure 2:
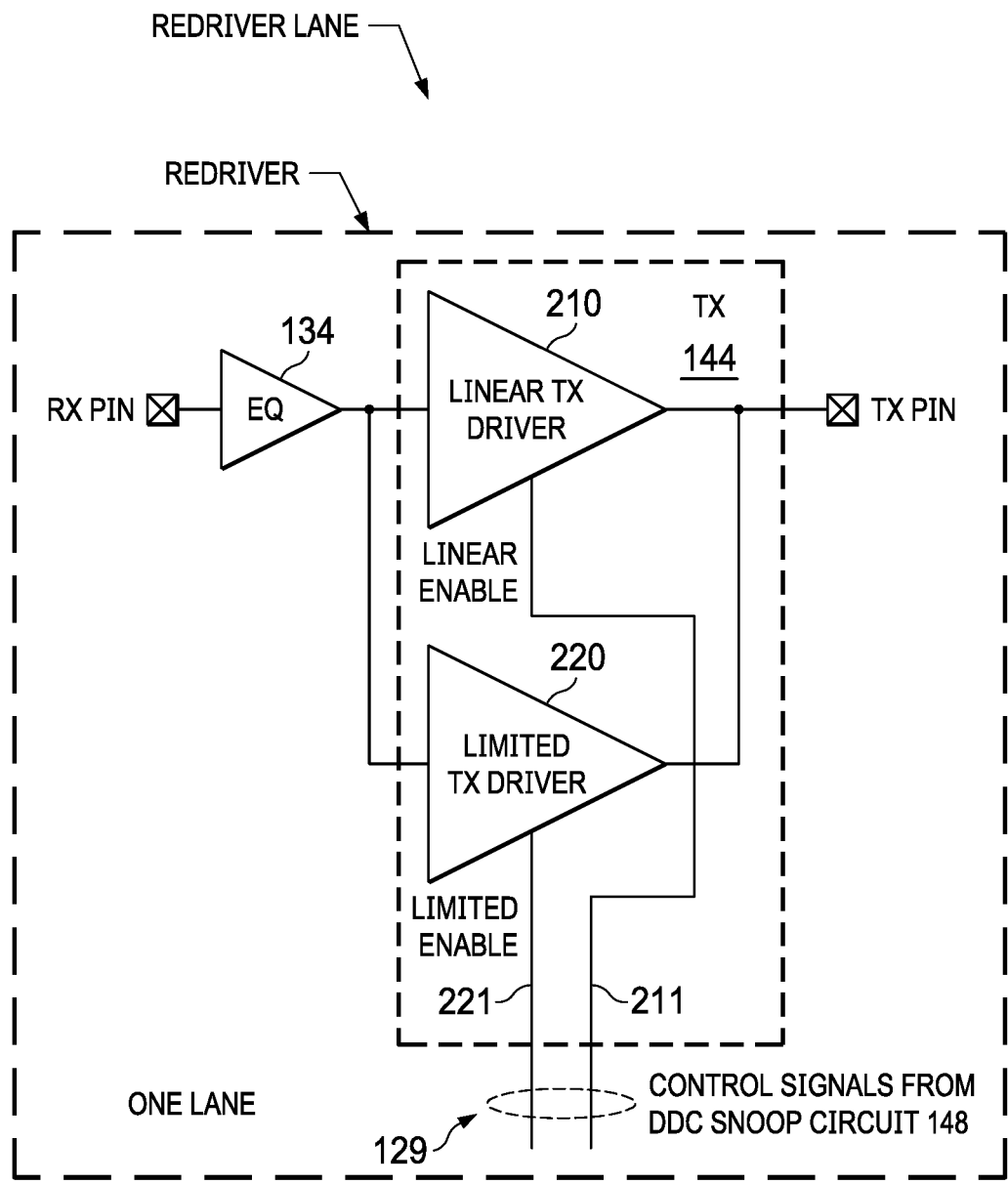
FIG. 2 is a block diagram of a transmitter within the redriver system having both linear and limited transmitters in accordance with an example.

The DDC snoop circuit 148 monitors the traffic on the DDC channel between the source and sink devices. In one embodiment, the DDC snoop circuit 148 decodes the writes from the source's GPU 112 to the sink device's SCDSC 167 which may contain the TMDS_Bit_Clock_Ratio and the FRL_Rate values. These values indicate whether the source and sink devices are being configured to operate according to HDMI 2.1 or to a previous version of HDMI (e.g., HDMI 1.4 or 2.0). The TMDS_Bit_Clock_Ratio bit being set equal to a "1" by the GPU 112 indicates that the GPU 112 intends for both the source and the sink to operate according to HDMI 2.0. The TMDS_Bit_Clock_Ratio bit being set equal to a "0" and with an FRL_Rate value equal to 0 indicates that the GPU 112 intends for both the source and the sink to operate according to HDMI 1.4. The DDC snoop circuit 148 monitors the traffic between the source 112 and the sink 160 for a write(s) by the source 112 to predetermined address(es) corresponding to the address(es) containing the TMDS_Bit_Clock_Ratio and FRL_RATE values. The write may be a single write to one address containing both values, or there may be two separate writes to two different addresses (each separate address containing one of the values). Upon detecting the write, the DDC snoop circuit 148 examines the TMDS_Bit_Clock_Ratio bit. If the DDC snoop circuit 148 determines that the source and sink devices 110 and 160 are to operate according to a non-HDMI 2.1 mode (e.g., HDMI 1.4 or 2.0), then the DDC snoop circuit 148 configures the transmitters 141-144 within the redriver system 130 for the limited mode. The DDC snoop circuit 148 asserts, for example, control signals 129 to the transmitters to configure them for the limited mode. FIG. 2 (described below) shows an example of how the transmitters are configured for the limited mode.

The sink device 160, however, may be an HDMI 2.1 device. In this situation, upon the logic 114 within the GPU 112 reading a non-zero Max_FRL_Rate value from the sink device's HF-VSDB 168, the source device's GPU 112 determines the data rate that both devices can support and writes an FRL_Rate value into the sink device's SCDCS 167. The DDC snoop circuit 148 snoops the write by the GPU 112 to the field containing the FRL_Rate. If the snooped FRL_Rate is a non-zero value is indicative that the source and sink devices 110 and 160 are being configured to implement HDMI 2.1. If the DDC snoop circuit 148 determines that the source and sink devices 110 and 160 are to operate according to the HDMI 2.1 mode, then the DDC snoop circuit 148 configures the transmitters 141-144 via control signals 129 within the redriver system 130 for the linear mode. FIG. 2 (described below) shows an example of how the transmitters within the redriver system 130 are configured for the linear mode.

Additionally, or alternatively, the GPU 112 may read a sink version from the sink's SCDCS 167, and the sink version may indicate that the sink device is an HDMI 2.1 device. The sink version is stored, for example, in a byte at offset 0x01 of the SCDCS 167.

In another embodiment, the DDC snoop circuit 148 configures the transmitters 141-144 for the linear mode response to detection of a non-zero FRL rate and the TMDS_Bit_Clock_Ratio bit being a "0." The TMDS_Bit_Clock_Ratio bit defaults to a value of "0" upon a power-on reset event within the source device's GPU 112 and will not be set to a value of "1" unless the sink device is determined to be HDMI 2.0-compliant. Thus, the value of TMDS_Bit_Clock_Ratio being "0" in the face of detection by the DDC snoop circuit 148 of a non-zero FRL rate (indicative of HDMI 2.1 operation) provides assurance to the DDC snoop circuit 148 that HDMI 2.1 is indeed enabled for operation by the source and sink devices.

FIG. 2 shows an example of equalizer 134 and transmitter 144. The implementation shown for transmitter 144 applies to transmitters 141-143 as well. The transmitter 144 includes a linear driver 210 and a limited diver 220. For a linear driver 210, the output signals are a linear function of the input signals, at least up to a certain input amplitude. For a limited driver 220, the output signals are not a linear function of the input signals. A limited driver includes output swing control and/or output de-emphasis or pre-emphasis.

Linear driver 210 can be enabled or disabled by control signal 211 from the DDC snoop circuit 148. Similarly, limited driver 220 can be enabled or disabled by control signal 221 from the DDC snoop circuit 148. In this example, control signals 211 and 221 comprise control signal 129 (FIG. 1). In one embodiment, the control signals 211 and 221 are separately generated signals, each provided to one of the drivers as shown in FIG. 2. In another embodiment, a single control signal is provided to both the drivers 211 and 221, with a logic high on the single control signal enabling, for example, linear driver 210 and disabling limited driver 220, and a logic low on the control signal enabling limited driver 220 and disabling linear driver 210.

Figure 3:
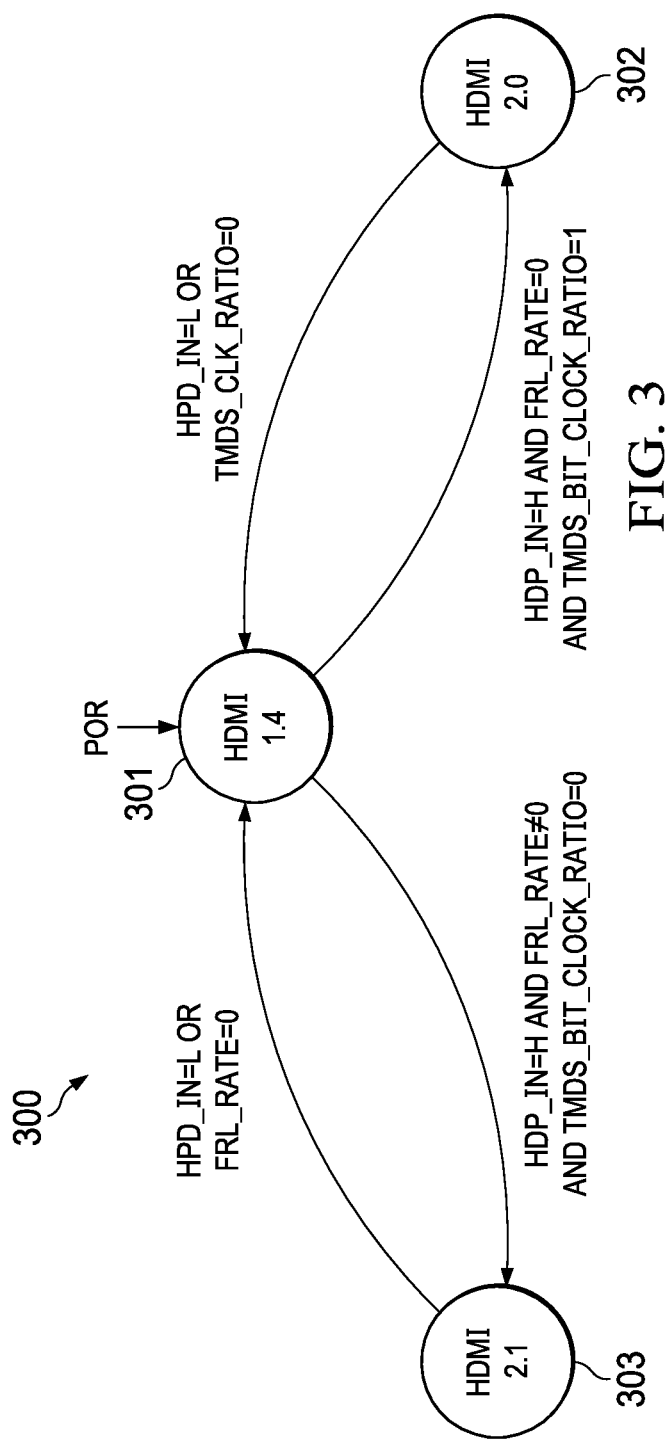
FIG. 3 is a state diagram illustrating the operational states of a snoop circuit within the redriver system, in accordance with an example.

In one example, the DDC snoop circuit 148 is implemented as a finite state machine (e.g., a combination of logic gates, flip-flops, etc. configured to implement the functionality described herein). FIG. 3 shows an example state diagram 300 defining the operation of the DDC snoop circuit 148. The state diagram 300 in this example includes three states 301, 302, and 303. In state 301, the source and sink devices are configured for HDMI 1.4 operation. In state 302, the source and sink devices are configured for HDMI 2.0 operation. In state 303, the source and sink devices are configured for HDMI 2.1 operation.

Upon a power-on event (POR), the DDC snoop circuit defaults to state 301 (HDMI 1.4). The HPD_IN signal being logic high indicates that the sink device 160 is on and has been cabled to the source device 110. If the DDC snoop circuit 148 detects that the FRL_Rate is not 0 and the TMDS_Bit_Clock_Ratio bit is 0, the DDC snoop circuit 148 transitions to state 303 in which the DDC snoop circuit 148 configures the transmitters 141-144 within the redriver system 130 for the linear mode.

If, from state 301, DDC snoop circuit 148 detects that the FRL_Rate is 0 and the TMDS_Bit_Clock_Ratio bit is a 1, then the DDC snoop circuit 148 transitions to state 302 and the DDC snoop circuit 148 configures the transmitters 141-144 for the limited mode. The DDC snoop circuit 148 also configures the transmitters 141-144 for the limited mode if the DDC snoop circuit 148 remains in its default state 301.

From state 303, if the cable 150 becomes disconnected or the sink device 160 is powered off, the HPD_IN signal will be logic low. If either the HPD_IN signal becomes logic low or an updated FRL_Rate equal to 0 is detected by the DDC snoop circuit 148 (e.g., the GPU 112 issues a write to the sink device to change the FRL_Rate to 0), the state of the DDC snoop circuit changes from state 303 to state 301. Upon entry into state 301 from state 303, the DDC snoop circuit 148 configures transmitters 141-144 for the limited mode.

From state 302, the state of the DDC snoop circuit 148 will change from state 302 to state 301 upon the HPD_IN signal being detected as logic low or the DDC snoop circuit detecting a change in the TMDS_Bit_Clock_ratio to a value of 0. Upon entry to state 301 from state 302, the DDC snoop circuit 148 maintains the configuration of transmitters 141-144 in the limited mode.

Figure 4:
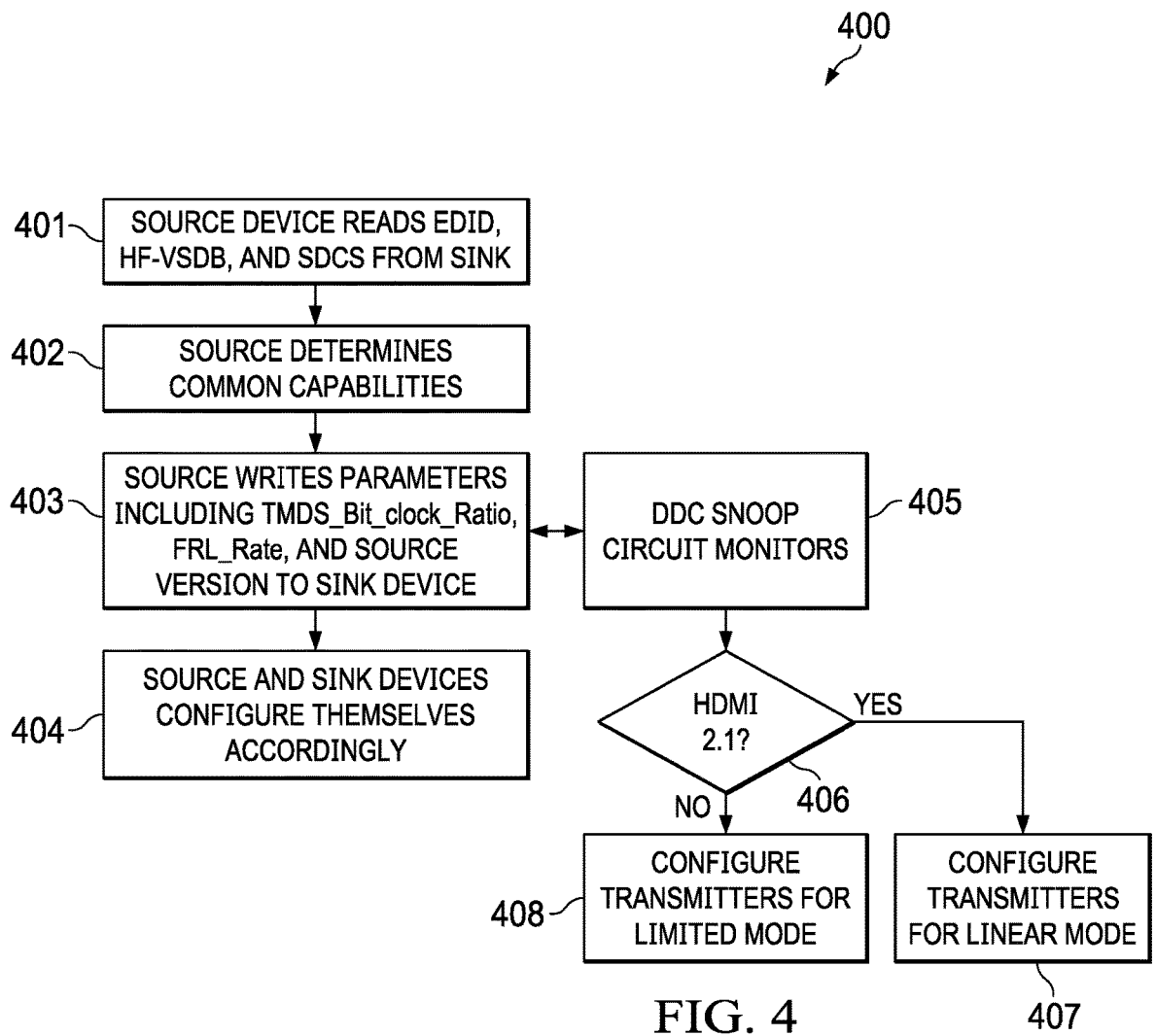
FIG. 4 is a flowchart illustrating an example method implemented by the snoop circuit.

FIG. 4 is a flow chart depicting an example method 400 implemented by the source device 110. Upon detection of a hot plug event, at step 401, the source device 110 (e.g., GPU 112) reads the sink device's EDID 165, SCDCS 167, and HF-VSDB 168. At 402, the source device 110 (e.g., GPU 112) determines the capabilities to be implemented by both the source and sink devices (e.g., data rate, resolution, pre-emphasis, etc.) At 403, the source device 110 (e.g., GPU 112) writes parameters back to the sink device 160 to indicate the protocol by which the source and sink devices are to communicate with each other. The write parameters include, for example, the TMDS_Bit_Clock_Ratio bit, the FRL_Rate, and the source's version identifier. At 404, the source and sink devices configure themselves according to the parameters determined by the source device.

During the parameter write at step 403, the DDC snoop circuit 148 monitors the traffic between the GPU 112 and sink device 160, such as the values of the TMDS_Bit_Clock_Ratio bit and the FRL_Rate written by GPU 112 to the sink device's SCDCS 167. Based on, for example, the values of the TMDS_Bit_Clock_Ratio bit and the FRL_Rate written by GPU 112 to the sink device 160, the DDC snoop circuit determines at 406 whether the source and sink devices are configured to operate according to HDMI 2.1. If the source and sink devices are configured to operate according to HDMI 2.1 (the "yes" branch), then at 407, the DDC snoop circuit 148 causes the transmitters 141-144 within the redriver system 130 to operate according to the linear mode. If the source and sink devices are not configured to operate according to HDMI 2.1 (the "no" branch), then at 408, the DDC snoop circuit 148 causes the transmitters 141-144 within the redriver system 130 to operate according to the limited mode.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A redriver system adapted for coupling to a first device and to a second device, comprising:
   a first transmitter driver configured to operate as a linear driver and having a first enable input;
   a second transmitter driver configured to operate as a limited driver and having a second enable input; and
   a snoop circuit coupled to the first and second enable inputs, the snoop circuit configured to:
   determine whether the first device and the second device are to operate according to a first protocol;
   responsive to the snoop circuit determining that the first and second devices are to operate according to the first protocol, enable the first transmitter driver and disable the second transmitter driver; and
   responsive to the snoop circuit determining that the first and second devices are to operate according to a second protocol, disable the first transmitter driver and enable the second transmitter driver.

2. The redriver system of claim 1, wherein the snoop circuit determines that the first and second devices are to operate according to the first protocol by detecting a non-zero fixed rate link (FRL) value.

3. The redriver system of claim 1, wherein the snoop circuit determines that the first and second devices are to operate according to the second protocol by detecting a fixed rate link (FRL) value equal to zero.

4. The redriver system of claim 1, wherein the snoop circuit determines that the first and second devices are to operate according to the second protocol by detecting an absence of a fixed rate link (FRL) value.

5. The redriver system of claim 1, wherein the first protocol is the High-Definition Multimedia Interface (HDMI) 2.1 protocol, and the second protocol is an HDMI protocol other than HDMI 2.1.

6. The redriver system of claim 1, wherein the first and second transmitter drivers are for a first data channel, and the redriver system includes third and fourth transmitter drivers, and wherein the snoop circuit is configured to:
   responsive to the snoop circuit determining that the first and second devices are to operate according to the first protocol, enable the third transmitter driver and disable the fourth transmitter driver; and
   responsive to the snoop circuit determining that the first and second devices are not to operate according to the first protocol, disable the third transmitter driver and disable the second transmitter driver.

7. The redriver system of claim 1, wherein the snoop circuit is configured to snoop write transactions by the first device to the second device.

8. The redriver system of claim 1, wherein the snoop circuit is configured to snoop write transactions by the first device to the second device by which the first device configures the second device.

9. A source device adapted to provide media data to a sink device, comprising:
   a graphics processor unit (GPU); and
   a redriver system coupled to the GPU, the redriver system including:
   a first transmitter driver configured to operate as a linear driver and having a first enable input;
   a second transmitter driver configured to operate as a limited driver and having a second enable input; and
   a snoop circuit coupled to the first and second enable inputs, the snoop circuit configured to:
   determine whether the first device and the second device are to operate according to a first protocol;
   responsive to the snoop circuit determining that the first and second devices are to operate according to the first protocol, enable the first transmitter and disable the second transmitter; and
   responsive to the snoop circuit determining that the first and second devices are not to operate according to the first protocol, disable the first transmitter and enable the second transmitter.

10. The source device of claim 9, wherein the snoop circuit determines that the source and sink devices are to operate according to the first protocol by detecting a non-zero fixed rate link (FRL) value.

11. The source device of claim 10, wherein the first protocol is a High-Definition Multimedia Interface (HDMI) 2.1 protocol.

12. The source device of claim 9, wherein the snoop circuit determines that the source and sink devices are to operate according to a second protocol by detecting a fixed rate link (FRL) value equal to zero.

13. The source device of claim 12, wherein the second protocol is a High-Definition Multimedia Interface (HDMI) protocol other than HDMI 2.1.

14. The source device of claim 12, wherein the snoop circuit determines that the source and sink devices are to operate according to the second protocol by detecting an absence of a fixed rate link (FRL) value.

15. The source device of claim 9, wherein the snoop circuit is configured to snoop write transactions from the GPU to the sink device.

16. The source device of claim 9, wherein the snoop circuit is configured to snoop write transactions by the first device to the second device by which the first device configures the second device.

17. A method, comprising:
   determining whether a first device and a second device are to operate according to a first protocol;
   responsive to determining that the first and second devices are to operate according to the first protocol, enabling a linear driver and disabling a limited driver; and responsive to the snoop circuit determining that the first and second devices are to operate according to a second protocol, disabling the linear driver and enabling the limited driver.

18. The method of claim 17, wherein determining that the first and second devices are to operate according to the first protocol includes detecting a non-zero fixed rate link (FRL) value.

19. The method of claim 17, wherein determining that the first and second devices are to operate according to the second protocol includes detecting at least one of a fixed rate link (FRL) value equal to zero or an absence of a fixed rate link (FRL) value.

20. The method of claim 17, wherein the first protocol is the High-Definition Multimedia Interface (HDMI) 2.1 protocol, and the second protocol is an HDMI protocol other than HDMI 2.1.

* * * * *